United States Patent [19]

Smith

[11] Patent Number: 5,539,677
[45] Date of Patent: Jul. 23, 1996

[54] METHOD AND APPARATUS FOR MEASURING FOOT SIZES

[76] Inventor: Stephen M. Smith, 132 Dartmouth St., Marlborough, Mass. 01742

[21] Appl. No.: 141,443

[22] Filed: Oct. 22, 1993

[51] Int. Cl.$^6$ ........................................ A43D 1/02
[52] U.S. Cl. .................... 364/560; 364/403; 364/749; 33/3 R
[58] Field of Search ............ 33/3 A, 3 R; 364/403–556, 364/560 E, 709.01–709.11, 236.8, 237.1, 918.4, 918.5, 919, 927.1; 382/22, 60

[56] References Cited

U.S. PATENT DOCUMENTS

| | | | |
|---|---|---|---|
| 4,294,014 | 10/1981 | Baumann et al. | 33/3 |
| 4,538,353 | 9/1985 | Gardner | 33/3 |
| 4,561,061 | 12/1985 | Sakamoto et al. | 364/550 |
| 4,561,183 | 12/1985 | Shores | 33/1 M |
| 4,604,807 | 8/1986 | Bock et al. | 33/3 |
| 4,745,290 | 5/1988 | Frankel et al. | 250/560 |
| 4,972,318 | 11/1990 | Brown et al. | 364/403 |
| 5,025,476 | 6/1991 | Gould et al. | 382/5 |
| 5,080,109 | 1/1993 | Arme, Jr. | 128/782 |
| 5,119,440 | 6/1992 | Duenyas et al. | 382/22 |
| 5,132,673 | 7/1992 | Ciavarella et al. | 33/1 M |
| 5,164,793 | 11/1992 | Woflersberger et al. | 356/376 |
| 5,206,804 | 4/1993 | Thies et al. | 364/401 |

OTHER PUBLICATIONS

George Omura, Mastering AutoCAD, 1987, pp. 292–307.

Primary Examiner—Emanuel T. Voeltz
Assistant Examiner—Craig Steven Miller
Attorney, Agent, or Firm—Limbach & Limbach

[57] ABSTRACT

An apparatus for electronically measuring a foot size including a tracing device for electronically tracing an outline of a consumer's foot, a data processing device for receiving measured foot outline data and for translating the foot outline data into a foot size, and a display device for displaying the foot size and foot outline data. A method for electronically measuring a foot size of a foot placed on a flat surface, including tracing a foot outline with a tracing device, transferring foot outline data to a data processing device, translating the foot outline data into a shoe size and displaying the shoe size and foot outline data.

14 Claims, 6 Drawing Sheets

METHOD AND APPARATUS FOR MEASURING FOOT SIZES

FIELD OF THE INVENTION

This invention relates in general to a method and apparatus for measuring foot sizes and more particularly for obtaining a shoe size from a traced foot outline.

BACKGROUND OF THE INVENTION

A substantial market has developed in recent years for purchasing items at home through shopping networks broadcast to a consumer via a television, for example QVC and the Home Shopping Network. Such shopping networks are not interactive. In other words, where a consumer desires to purchase a product offered via the network, the consumer must use the telephone to order the product. In addition, the consumer is limited to a pictorial representation of the goods.

One problem with the above system for ordering goods is that the consumer does not have confidence in the merchandise which is being purchased. More particularly, for fashion merchandise, the consumer must order from available sizes of goods offered and cannot be insured that the goods will fit properly. Also, with respect to footwear, due to variations in shoe sizes offered by various manufacturers and a consumer's changing foot size, a consumer can never be certain that the ordered footwear will fit properly.

In addition, in self service shoe stores, there is a need for a measuring device to allow a consumer to measure his or her foot size quickly and accurately and without great expense to the store. Presently, self service shoe stores are limited to manual Brannock or Ritz stick type measuring devices. However, a problem with these devices is that many consumers do not know how to use them. In addition, these devices do not provide measurements which allow for footwear to be custom fit, instead the consumer is limited to a standard length and width shoe size.

Accordingly, Thies et al. (U.S. Pat. No. 5,206,804) disclosed a system for footwear visual image cataloging and selection. The system includes a three-dimensional electronic scanner unit which creates an electronic image of a foot which is placed on the scanner, and a central computer which is coupled to the scanner and which receives the image data. The central computer also receives customer identification data and customer preference data input by the customer using an input device. In addition, the system includes a storage device which is coupled to the central computer for storing the image data and footwear related data for retrieval by a customer using the image and cataloging system. Further, the system includes a display device which displays the image data related to the measured foot, as well as footwear related data stored in the storage device.

A problem with the above disclosed image and cataloging system is the large size of the foot scanner unit which creates the images of the measured foot. Such a device must be large enough to receive a foot on a flat surface so that a three-dimensional image can be formed. Therefore, the device must be large enough to accommodate the largest foot sizes. In addition the device must have a light source which is directed at the foot being scanned, an optical scan head coupled to the light source and a controller for adjusting the light intensity of the scan head. Therefore, the scanning apparatus of the prior art is neither portable nor inexpensive.

Another problem with the scanning unit disclosed by Thies et al. is the length of time and amount of data to scan a consumer's foot and to process the data for ultimate display on the display unit. For example during a typical scanning operation, a foot to be scanned is placed upon one side of the reference surface and the optical scan head disposed along an opposite side of the reference surface is moved along a track to scan the foot. However, such a scanner requires resolution on the order of 520×220 pixels worth of data, each covering an area of 5 square millimeters. In addition, the central computer must compute a level heeled foot length, foot width, arch-line, and foot curvature from the data received from the foot image scanner before displaying an image to the user. Thus, from a user's point of view, the length of time it actually takes to scan the foot and process the data can be too long. In addition, the length of time may result in a user moving during the scanning process which may result in inaccuracies in the foot measurement.

Accordingly, the present invention is directed to solving the problems of prior art apparatus and, more particularly, reducing the length of time and amount of data required to create an image of a foot according the prior art method and apparatus.

In addition, the present invention is directed to solving the problems of the cost and size associated with the prior art apparatus for creating such an image.

In addition, the present invention is directed to solving the problem of a lack of measuring devices in the self service shoe industry.

Further, the present invention is directed to solving the confidence problems associated with ordering footwear through the televised home shopping industry.

SUMMARY OF THE INVENTION

An apparatus is provided for electronically measuring a foot size which includes a tracing device for electronically tracing an outline of a consumers foot, a data processing device for receiving measured foot outline data and for translating the foot outline data into a foot size, and a display device for displaying the foot size and foot outline data. Accordingly, a consumer may trace an outline of his foot on a flat surface with the tracing device and the consumer's foot size and foot outline will instantly be displayed to the consumer. This information can then be used by a consumer in a self service shoe store or transmitted to a retailer/wholesaler for retrieval of a selected pair of shoes and delivery to the consumer.

A method is provided for electronically measuring a foot size of a foot placed on a flat surface, including tracing a foot outline with a tracing device, transferring foot outline data to a data processing device, translating the foot outline data into a shoe size and displaying the shoe size and foot outline data.

BRIEF DESCRIPTION OF THE DRAWINGS

The foregoing and other objects and advantages of the invention will become apparent with reference to the following detailed description of the preferred embodiments as illustrated by the drawings in which.

DETAILED DESCRIPTION OF THE INVENTION

Figure 1:
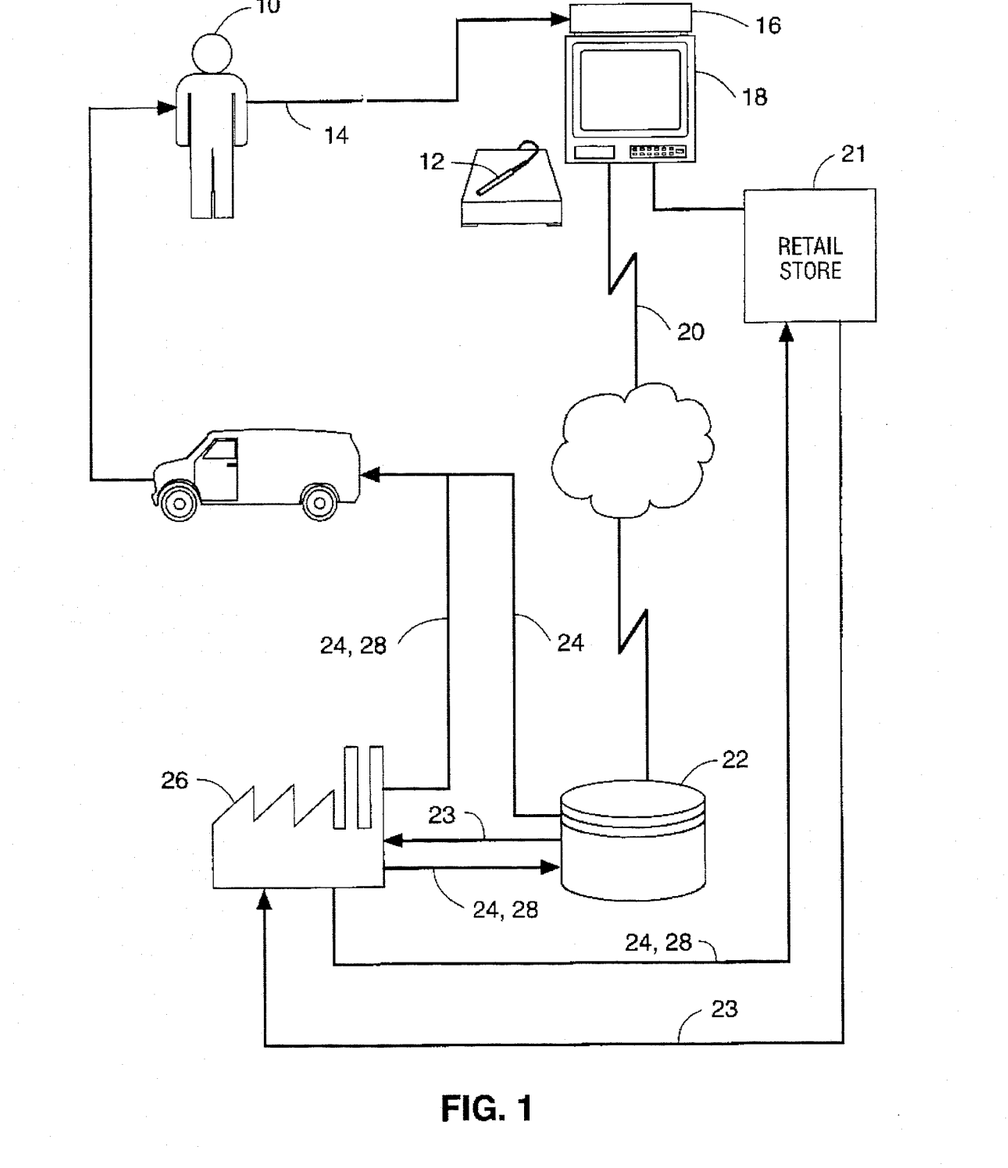
FIG. 1 illustrates a preferred embodiment for use of the present invention.

FIG. 1 illustrates one preferred embodiment for use of the present invention. This system is intended to be utilized in the home by a consumer who already has interactive television capabilities or a home computer which is tied into an information highway, and a tracing device which is configured to communicate with the television set or computer. The system allows a user to send shoe size information directly to a home shopping supplier who is offering the product or to a manufacturer to use the information to manufacture an appropriately sized footwear product. Alternatively, the system can be used as a stand alone system in a retail/wholesale store by a consumer and the information can be tied directly into the store's central computer.

A consumer 10 of footwear either in the retail/wholesale store or at home, traces an outline of his foot with tracing device 12 to create foot outline data 14 which is readable by processing device 16 which, for instance, may be a home computer or a controller for an interactive television system. The foot outline data is transferred to processing device 16. From the foot outline data, a foot size is computed. A foot size can be assigned according to any foot sizing method.

After a foot size of the consumer is determined, the foot size and foot outline data are displayed via display device 18 to the consumer. Where the present invention is being used at home, the foot size information can then be transmitted via communication link 20 as an order to the home shopping industry supplier 22 along with footwear style/model information for checking inventory to determine if such a size of a desired footwear model is available to provide to the consumer. If the particular footwear is available in inventory, the footwear 24 can be shipped to the consumer. Alternatively, where the invention is being used in a retail/wholesale store 21, the foot size information can be used by the consumer or a store employee to instantly retrieve the appropriate footwear for purchase.

Where the footwear is not available in the inventory of the home shopping supplier or the retail/wholesale store, the foot size information 23 can be transmitted to a factory 26 for the manufacture of the desired footwear. The desired footwear 24 can then be shipped either directly to the consumer, to the home shopping supplier or to the wholesale/retail store. In addition, the foot size information can be utilized by the manufacturer to manufacture an appropriately sized footwear product 28, which can either be shipped directly to the consumer, to the home shopping supplier, or to the wholesale/retail store.

Therefore, with the present invention, the consumer need not worry about fit problems associated with the prior art methods since the footwear ordered will be matched to the consumer's foot outline. In addition, the present invention provides a quick and accurate device for measuring a consumer's shoe size which may be utilized by the shoe industry in general.

Figure 2:
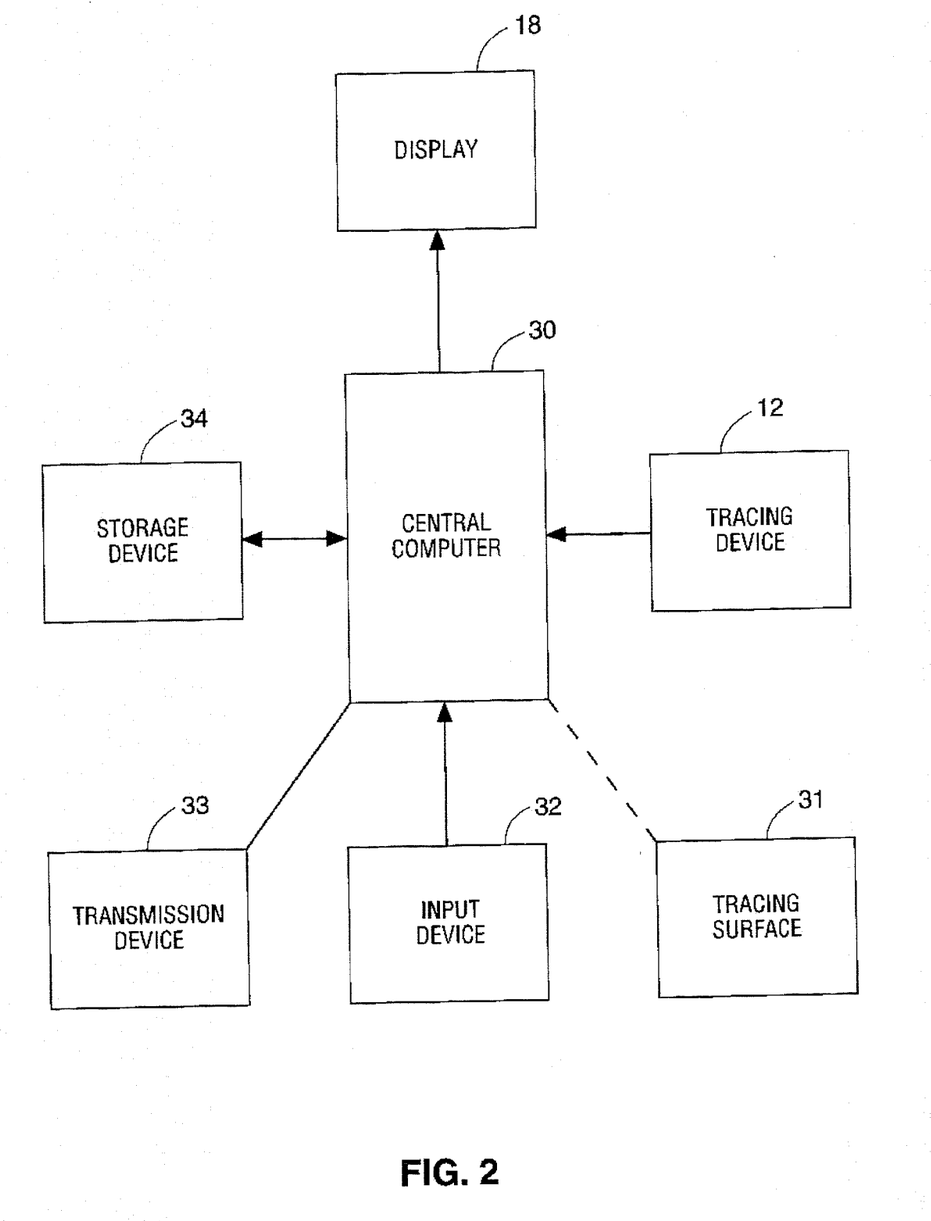
FIG. 2 is a block diagram illustrating the apparatus of the present invention in one preferred embodiment.

Referring now to FIG. 2, a block diagram illustrating the apparatus of the present invention is shown. A central computer 30 controls operations of several peripheral devices. Tracing device 12 is coupled to a central computer and provides information to the central computer concerning a consumer's foot outline. The tracing device may be one of many types of devices including a pen mouse, a track ball, a light pen, a high precision probe and the like. It will be appreciated by those skilled in the art that improved tracing devices may be substituted for the use in the preferred embodiment as they are developed. In the preferred embodiment of the present invention, the tracing device is a pen mouse manufactured by Appoint of Pleasanton, Calif. under the trademark MOUSE PEN PRO. Alternately, a light pen can be used in conjunction with an optional tablet 31 to trace an outline of a consumer's foot placed on the tablet surface. In the preferred embodiment of the invention, the optional graphics tablet is manufactured by ACECAD of Monterey, Calif. under the trademark TM ACECAT PEN TABLET.

By utilizing a pen mouse, the tracing surface may be any flat, non-slip surface, including a floor. Further, using any tracing device, instead of tracing a complete foot outline, one may draw a mark at the back of the foot, the front most portion of the foot and on opposite sides of the widest part of the foot since the position of such marks contain all the information needed to size shoes. These marks can then be translated into foot size data.

Thus, the present invention's tracing device is portable and inexpensive since only a light pen, pen mouse or similar device is needed. Further, a home consumer may already own a light pen, pen mouse or similar tracing implement for other purposes, in which case, he/she need not purchase any additional hardware. In addition, with the present invention a consumer can accomplish a trace of a foot outline in seconds and with no inaccuracies due to movement of a consumer's foot during the tracing. Further, the amount of data required to be processed and to represent an outline of a consumers foot is small, and thus the time of measurement is significantly reduced.

The central computer is also coupled to input device 32 for obtaining information from a user, such as name, address, a preferred style or model of footwear, and the like and for supplying such information to the central computer. The input device may include many types of electronic input devices including a keyboard, a touch screen, a light pen and the like. In fact it may be the same device as the tracing device 12. It will be appreciated by those skilled in the art that improved input devices may be substituted for use in the preferred embodiment as they are developed. In the preferred embodiment, the input device is the pen mouse which is also used as the tracing device.

A storage device 34 is also coupled to the central computer for storage of information received and/or created by the central computer, for example, data indicative of a consumer's foot outline and computed shoe size. The storage device may be many types of storage devices including tape drives, hard disk drives, optical disk drives, CD ROMS, static RAMS, and the like. In the preferred embodiment, the storage device is any addressable memory.

Also coupled to the central computer is a display device 18 for receiving images to be displayed from the central computer. A display device may include one of many commercially available display devices. In the preferred embodiment of the present invention, when the apparatus is to be used in the consumer's home, the display device is a television set or a home computer monitor. Alternatively, in a retail/wholesale store, the display device is a high resolution graphics or television monitor.

Further coupled to the central computer is a transmission device 33 for transmitting consumer information and shoe size data to the home shopping supplier, the retail/wholesale store central computer, or the manufacturer. In the preferred embodiment of the invention where the apparatus is used at home, the transmissive device is a modem coupled to a telephone line or an interface tied to the communication highway in an interactive television set. Alternatively, in the retail/wholesale store, the transmission device may be an interface cable tied directly to the central computer of the store or a modem for transmitting the information to the manufacturer. It will be appreciated by those skilled in the art that improved transmission devices may also be substituted for use in the preferred embodiment as they are developed.

In another embodiment of the invention, the central computer 30, the display 18, the tracing device 12, the input device 32, the tablet 31, the transmission device 33 and the storage device 34 comprise a single integrated unit. In the retail store environment, all componentry may be contained in a single integrated unit shaped to accept a foot on a flat surface thereof, on which the foot can be traced by any one of the previously mentioned tracing means and a display window which will display the determined size of the traced foot. In fact, in the retail/wholesale store environment, the device may be completely freestanding without means for transmitting data to a remote location but only to the display window on the device. In such an embodiment, the device is simply a shoe sizing apparatus which tells the user his/her shoe size and then allows him/her to attempt to find a desirable shoe from the shelves of the store. It will be appreciated by those skilled in the art that the improved integrated units can be substituted for the specific embodiment as they are developed and that the integrated unit need not include any of the optional tablet, the transmission device, or a separate input device distinct from the tracing device.

Figure 3A:
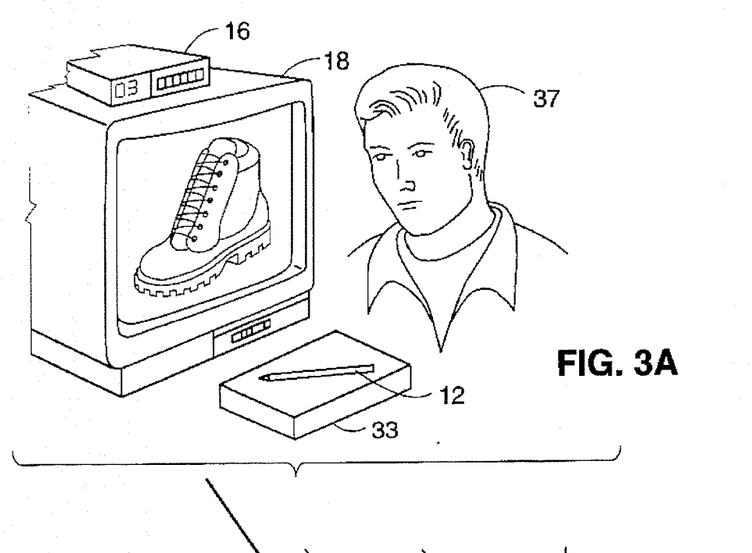
FIG. 3a–3c illustrate a specific embodiment of the present invention to be utilized in the home.
Figure 3B:
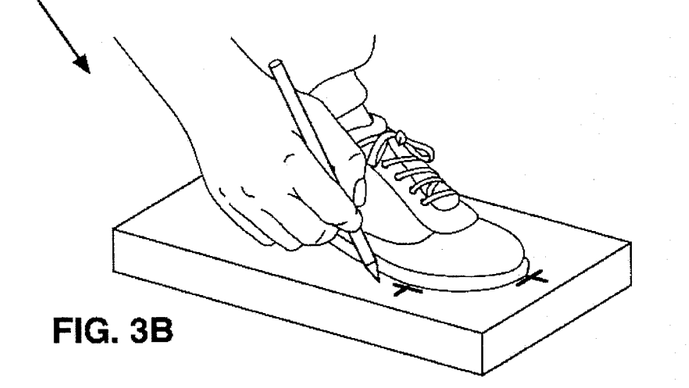
Figure 3C:
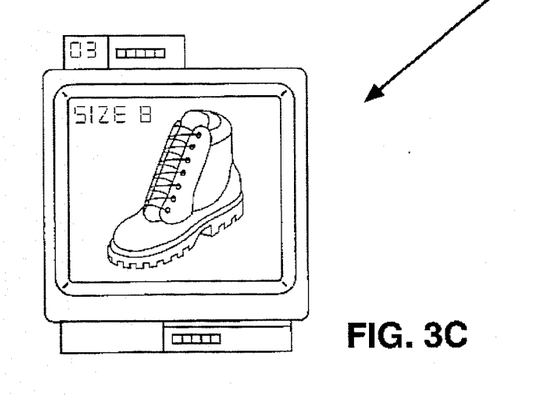
Figure 4A:
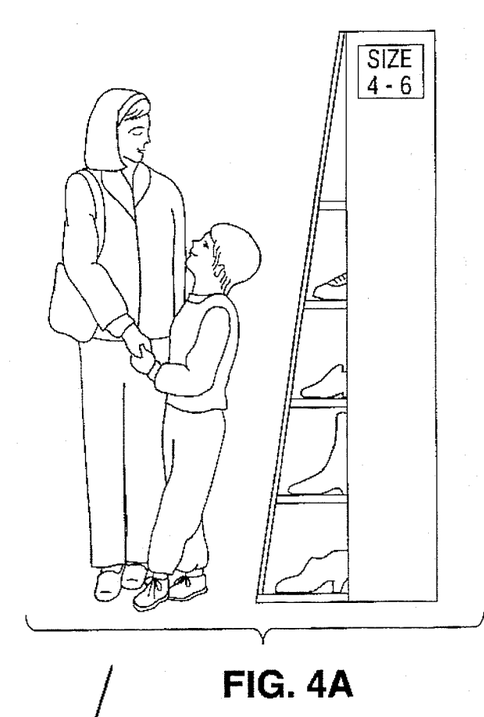
FIG. 4 illustrates another embodiment of the present invention to be utilized in a retail/wholesale store.
Figure 4B:
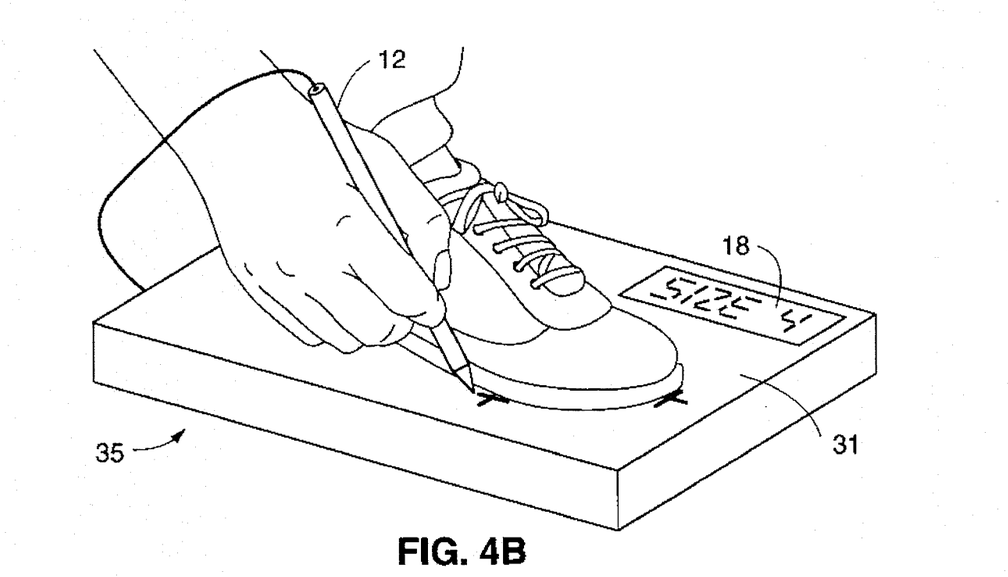

Referring now to FIG. 3a, there is shown an embodiment of the present invention to be used at home including a processing device 16, which may be a home computer monitor or interactive television controller, a display device 18, which, for example, may be a home computer or an interactive TV, a tracing device 12 and a tracing surface 33, which may be a non-slip surface when tracing device 12 is a pen mouse, or a tablet when tracing device 12 is a light pen. A user 37 of the device, as shown in FIG. 3b, may trace either an outline of his foot or may draw marks at selected positions of the foot. The information is then transmitted to the home computer/interactive TV unit 16 for processing of the information and display of the user's foot size as shown in FIG. 3c. Referring now to FIG. 4, there is shown an alternative embodiment of the present invention to be utilized in a retail/wholesale shoe store. In this application, the specific embodiment is a fully integrated unit 35 including tracing device 12, tracing tablet 31 and display 18. In this application a user may either trace an entire outline of his foot or make designated marks at the selected positions of the foot. The foot outline information is then processed by the unit 35 and displayed as a shoe size at display 18.

Figure 5:
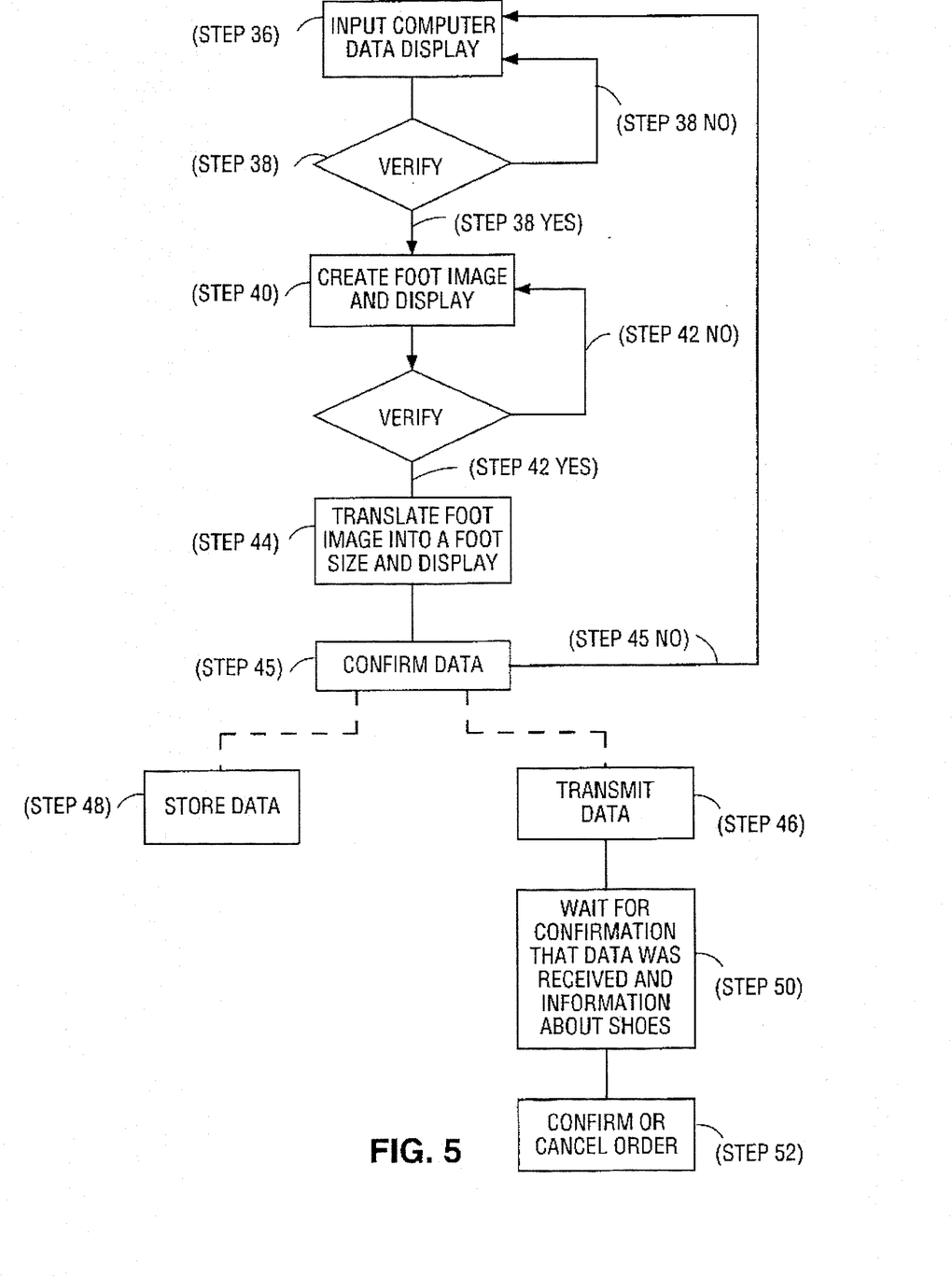
FIG. 5 is a flow chart illustrating a data flow according to the present invention.

Referring now to FIG. 5, there is shown a flow chart illustrating data flow according to a preferred embodiment of the present invention. A user of the apparatus first specifies customer information to the central computer via the input device 32 which is then displayed to the user for verification (Step 36). Such information may include name, address, age, desired footwear model, credit card information, etc. Upon input of the customer information, the information is verified by the user (Step 38 YES) or, alternatively, the user is requested to enter the information again (Step 38 NO). The user is then prompted (Step 40) to create an outline of his foot by either tracing around the entire foot with the tracing device or alternatively marking selected locations on the foot. The information is simultaneously displayed to the user for verification (Step 40). The user may then verify such foot outline data (Step 42 YES) or, alternatively, if a verification is not received (Step 42 NO), may repeat the create foot outline step again. The central computer then translates the foot outline data into a foot size information and cause the foot size to be displayed (Step 44). The user or consumer is then asked to confirm the information (Step 45 YES). Alternatively, if the user or consumer does not confirm all of the information (Step 45 NO), the process is started over. In a retail/wholesale outlet, the process may be complete at this point and the user can then seek an appropriately sized pair of shoes. However, in a preferred embodiment, upon confirmation, the foot size and customer data may then be sent to the storage device for storage (Step 48). In addition, the foot size and customer data may be transmitted (Step 46) either to the home shopping supplier, the retail/wholesale central computer, or the manufacturer. The apparatus then awaits (step 50) confirmation that data was received and, preferably, information concerning the availability, cost, and expected delivery date of the shoes. The consumer can then confirm or cancel his/her order.

Figure 6:
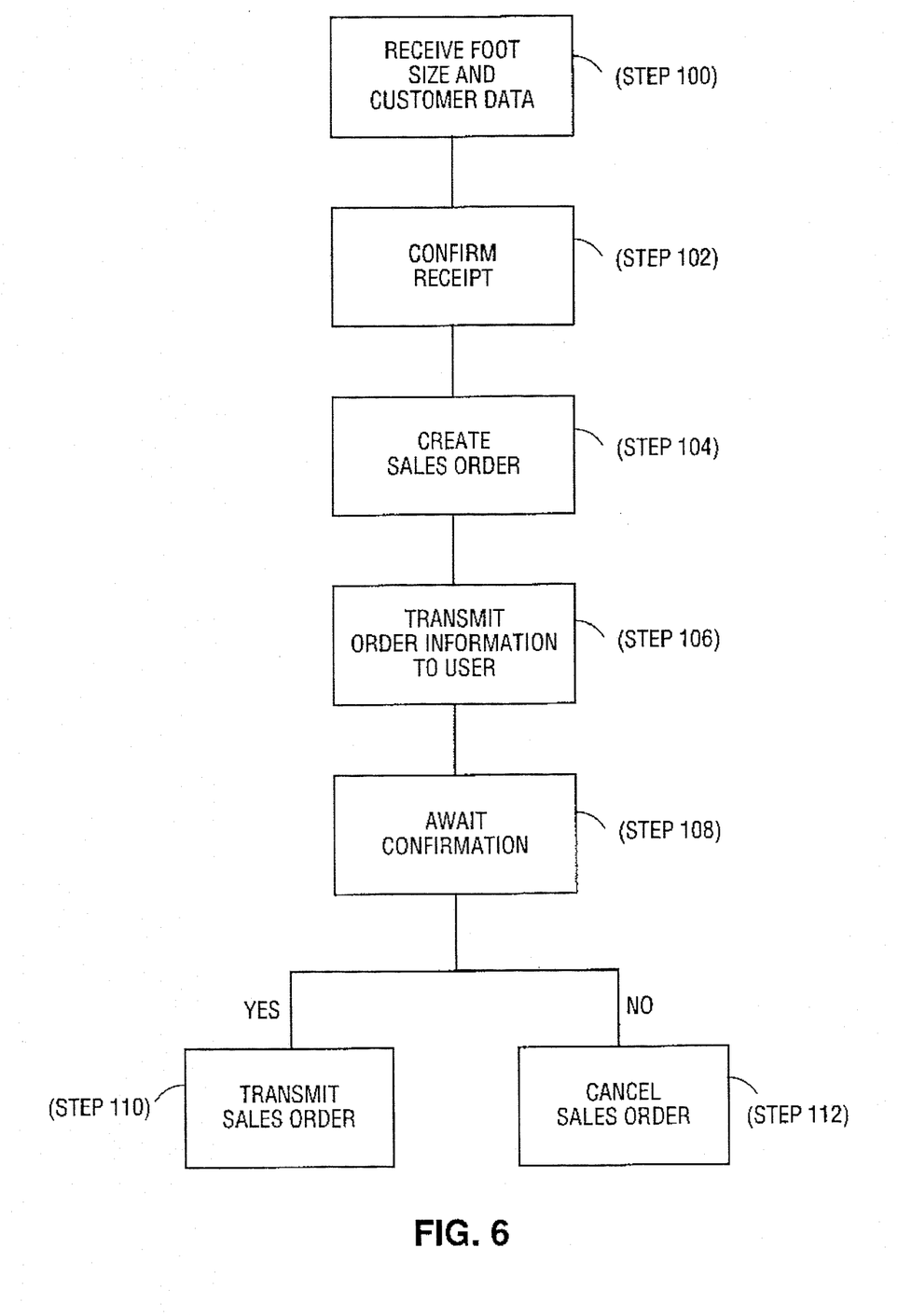
FIG. 6 is a flow chart illustrating data flow after transmission of data collected by the present invention.

FIG. 6 is a flow chart of data flow in the computer at the location of the home shopping supplier, retailer or manufacturer. The foot size and customer data is received (Step 100) and a confirmation is sent (Step 102) to the consumer that the information has been received. The home shopping supplier or retail/wholesaler store computer then creates a sales order (Step 104) which is used to check inventory, and possibly to order the shoes where not in inventory. The computer then transmits information back to the computer at the user's location providing him with information concerning his prospective purchase such as availability, confirmation of cost, expected delivery date of the shoes, etc. (Step 106). The computer then awaits confirmation or cancellation of the order by the user (Step 108). If the order is confirmed, the sales order is transmitted to the warehouse or manufacturer (Step 110). If the user cancels the order, the sales order is cancelled (Step 112).

Having now described the foregoing embodiment of the invention, it should be clear to those skilled in the art that the foregoing is merely illustrative and has been presented by way of example only. Numerous other embodiments are within the scope of one of ordinary skill in the art and are contemplated as following within the scope of the invention as defined by the claims.

What is claimed is:

1. An apparatus for measuring a foot size, comprising:

a host computer comprising an input terminal, a pen mouse for tracing an outline of a foot and generating data representative of the foot outline, said pen mouse having an output terminal at which said data representative of the foot outline is presented, said output terminal coupled to said input terminal of said computer;

said host computer having a central processing unit including means for transforming said foot outline data into shoe size data, and an output terminal at which said shoe size data is presented;

a display monitor having an input coupled to said output terminal of said computer which receives said shoe size data and displays said shoe size data;

means within said computer for causing said display monitor to generate a display which prompts a user to enter information identifying a footwear product which said user wishes to purchase;

an input device coupled to said host computer through which said user can enter said identifying information into said computer; and means having an input terminal coupled to said output of said computer for receiving said shoe size data and said identifying information and for transmitting said shoe size data and said identifying information to a remote receiver for processing said shoe size data and said identifying information.

2. An apparatus as set forth in claim 1 wherein said input device is a computer keyboard.

3. An apparatus as set forth in claim 1 wherein said input device is said pen mouse.

4. An apparatus as set forth in claim 2 further comprising:

means at said remote location for generating a sales order in accordance with said shoe size information and identifying information, means at said remote location for transmitting said sales order to said computer, and means within said computer for receiving said sales order and displaying a confirmation of said sales order on said display monitor.

5. An apparatus as set forth in claim 4 wherein said display monitor is an interactive television set and said means for transmitting is part of said interactive television set.

6. An apparatus as set forth in claim 4 wherein said means for transmitting comprises a modem.

7. An apparatus as set forth in claim 4 wherein said means for transmitting comprises an interface cable.

8. An apparatus for measuring a foot size, comprising:

a host computer comprising an input terminal, a light pen and tablet combination for tracing an outline of at least a portion of a foot and generating data representative of the foot outline, said combination having an output terminal at which said data representative of the foot outline is presented, said output terminal coupled to said input terminal of said host computer;

said host computer having a central processing unit includes means for transforming said foot outline data into shoe size data and an output terminal which outputs said shoe size data;

a display device having an input coupled to said output terminal of said computer which receives said shoe size data and displays said shoe size data;

means within said computer for causing said display device to generate a display which prompts a consumer to enter information identifying a footwear product which said consumer wishes to purchase;

an input device coupled to said host computer through which said consumer can enter said identifying information into said computer; and means having an input terminal coupled to said output of said computer for receiving said shoe size data and said identifying information and for transmitting said shoe size data and said identifying information to a remote receiver for processing said shoe size data and said identifying information.

9. An apparatus as set forth in claim 8 wherein said input device is a computer keyboard.

10. An apparatus as set forth in claim 8 wherein said input device is said light pen.

11. An apparatus as set forth in claim 9 further comprising;

means at said remote location for generating a sales order in accordance with said shoe size information and identifying information, means at said remote location for transmitting said sales order to said computer, and means within said computer for receiving said sales order and displaying a confirmation of said sales order on said display monitor.

12. An apparatus as set forth in claim 11 wherein said display monitor is an interactive television set and said means for transmitting is part of said television set.

13. An apparatus as set forth in claim 11 wherein said means for transmitting comprises a modem.

14. An apparatus as set forth in claim 11 wherein said means for transmitting comprises an interface cable.

* * * * *